(12) United States Patent
Lee et al.

(10) Patent No.: US 10,253,224 B2
(45) Date of Patent: Apr. 9, 2019

(54) ADHESIVE COMPOSITION FOR TOUCH PANELS, ADHESIVE FILM, AND TOUCH PANEL

(71) Applicant: LG Chem, Ltd., Seoul (KR)

(72) Inventors: Sle Lee, Incheon (KR); Hu-Young Yoon, Gyeonggi-do (KR); Chan-Oh Yoon, Chungcheongbuk-do (KR); Jang-Soon Kim, Gyeonggi-do (KR)

(73) Assignee: LG Chem, Lt. (KR)

( * ) Notice: Subject to any disclaimer, the term of this patent is extended or adjusted under 35 U.S.C. 154(b) by 0 days.

(21) Appl. No.: 15/513,427

(22) PCT Filed: Sep. 23, 2015

(86) PCT No.: PCT/KR2015/010040
§ 371 (c)(1),
(2) Date: Mar. 22, 2017

(87) PCT Pub. No.: WO2016/052916
PCT Pub. Date: Apr. 7, 2016

(65) Prior Publication Data
US 2017/0306196 A1    Oct. 26, 2017

(30) Foreign Application Priority Data

Sep. 30, 2014  (KR) .................. 10-2014-0131874

(51) Int. Cl.
| | | |
|---|---|---|
| *G02F 1/1335* | (2006.01) | |
| *C09J 133/14* | (2006.01) | |
| *G06F 3/041* | (2006.01) | |
| *C08F 220/18* | (2006.01) | |
| *C09J 7/38* | (2018.01) | |
| *C09J 175/04* | (2006.01) | |
| *C08G 18/62* | (2006.01) | |
| *C08G 18/73* | (2006.01) | |
| *C08G 18/79* | (2006.01) | |

(52) U.S. Cl.
CPC .......... *C09J 133/14* (2013.01); *C08F 220/18* (2013.01); *C08G 18/6229* (2013.01); *C08G 18/73* (2013.01); *C08G 18/79* (2013.01); *C08G 18/792* (2013.01); *C09J 7/385* (2018.01); *C09J 175/04* (2013.01); *G06F 3/041* (2013.01); *C09J 2203/318* (2013.01); *C09J 2400/163* (2013.01); *C09J 2467/006* (2013.01)

(58) Field of Classification Search
USPC ............................................ 349/96; 525/450
See application file for complete search history.

(56) References Cited

U.S. PATENT DOCUMENTS

| | | | |
|---|---|---|---|
| 2011/0234948 A1* | 9/2011 | Yoon .......................... | C09J 4/06 349/96 |
| 2013/0015909 A1 | 1/2013 | Kim et al. | |
| 2013/0211028 A1 | 8/2013 | Shinike et al. | |
| 2013/0236673 A1 | 9/2013 | Kim et al. | |
| 2013/0321991 A1 | 12/2013 | Lee et al. | |
| 2014/0178608 A1 | 6/2014 | Yoon et al. | |

FOREIGN PATENT DOCUMENTS

| | | |
|---|---|---|
| JP | 2010261029 A | 11/2010 |
| JP | 2012041456 A | 3/2012 |
| KR | 100983026 B1 | 9/2010 |
| KR | 20110111826 A | 10/2011 |
| KR | 20120056174 A | 6/2012 |
| KR | 20130023183 A | 3/2013 |
| KR | 101286829 B1 | 7/2013 |

OTHER PUBLICATIONS

International Search Report for Application No. PCT/KR2015/010040 dated Jan. 7, 2016.

* cited by examiner

*Primary Examiner* — Monique R Peets
(74) *Attorney, Agent, or Firm* — Lerner, David, Littenberg, Krumholz & Mentlik, LLP

(57) ABSTRACT

Provided is an adhesive composition for touch panels, including: an acrylic resin; a first curing agent having one to three functional groups; and a second curing agent having four to six functional groups. Provided is an adhesive film including an adhesive layer, which is a cured product of the adhesive composition for touch panels. Provided is a touch panel including: a conductive plastic film which has a conductive layer formed on one side thereof; and an adhesive layer which is attached to the conductive layer and includes a cured product of the adhesive composition for touch panels.

14 Claims, 1 Drawing Sheet

[Figure 1]
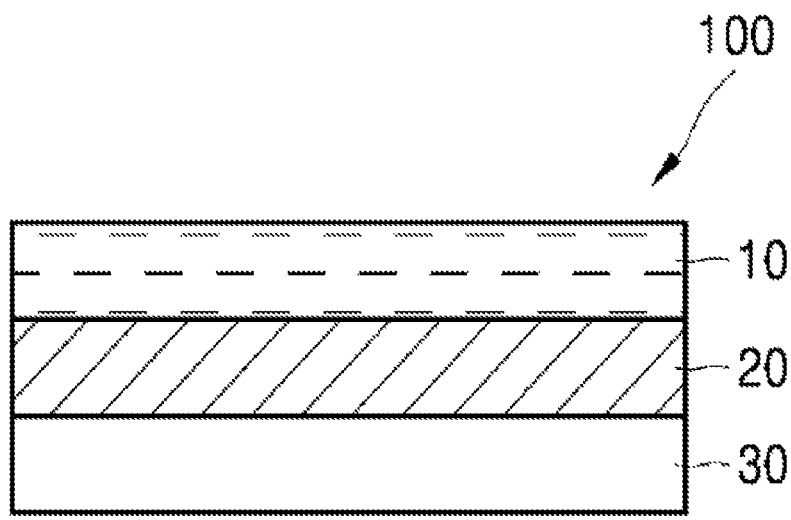
[Figure 2]
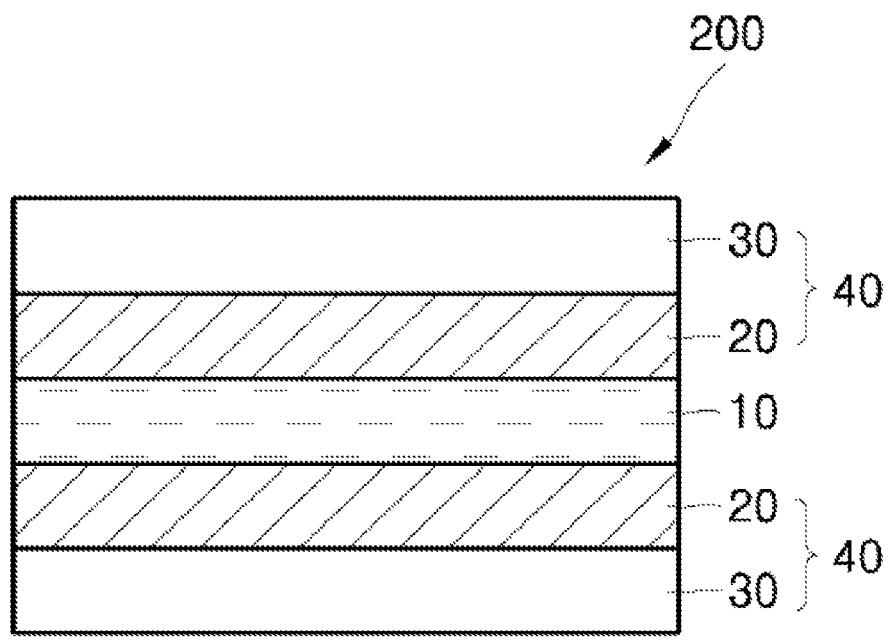

ADHESIVE COMPOSITION FOR TOUCH PANELS, ADHESIVE FILM, AND TOUCH PANEL

CROSS-REFERENCE TO RELATED APPLICATIONS

This application is a national phase entry under 35 U.S.C. § 371 of International Application No. PCT/KR2015/010040, filed Sep. 23, 2015, which claims priority to Korean Application No. 10-2014-0131874, filed Sep. 30, 2014, the disclosures of which are incorporated herein by reference.

TECHNICAL FIELD

The present invention relates to an adhesive composition for touch panels, an adhesive film, and a touch panel.

BACKGROUND ART

Recently, electronic devices such as PDAs, mobile communication terminals, or navigation systems for vehicles share a large part of an electronic market. In these electronic devices, examples of achieving a technical goal usually include thinner devices, lighter devices, power consumption reduction, high resolution devices, high luminance devices, and the like.

Meanwhile, transparent conductive plastic films are used in electronic devices in which a touch screen or a touch panel switch is installed at an input operation part in order to make devices lighter and prevent breakage of devices. Examples thereof include a film which uses a polyethylene terephthalate (PET) film as a base material and has a conductive layer, such as indium tin oxide (ITO), formed on one surface of the PET film, and the film is laminated on a conductive glass, a reinforcing material, a decoration film, and the like by an adhesive layer.

DETAILED DESCRIPTION OF THE INVENTION

Technical Problem

An exemplary embodiment of the present invention provides an adhesive composition for touch panels, which has excellent reliability against a bubble generation phenomenon and a white turbidity phenomenon.

Another exemplary embodiment of the present invention provides an adhesive film using the adhesive composition for touch panels.

Still another exemplary embodiment of the present invention provides a touch panel to which the adhesive film is applied.

Technical Solution

An exemplary embodiment of the present invention provides an adhesive composition for touch panels, including: an acrylic resin; a first curing agent having one to three functional groups; and a second curing agent having four to six functional groups.

The adhesive composition for touch panels may include the first curing agent and the second curing agent in an amount of about 0.01 part by weight to about 1 part by weight based on 100 parts by weight of the acrylic resin.

The first curing agent and the second curing agent may be a hexamethylene diisocyanate (HDI)-based curing agent.

A chain length of the first curing agent may be longer than a chain length of the second curing agent.

The acrylic resin may be formed by polymerizing a (meth)acrylic acid ester-based monomer; and a hydrophilic functional group-containing monomer.

The hydrophilic functional group-containing monomer may be polymerized in a content of about 5 parts by weight to about 30 parts by weight based on 100 parts by weight of the (meth)acrylic acid ester-based monomer.

The hydrophilic functional group-containing monomer may be one or more selected from the group consisting of a hydroxyl group-containing monomer, an amino group-containing monomer, a carboxyl group-containing monomer, a sulfone group-containing monomer, a morpholine group-containing monomer, a glycidyl group-containing monomer, and a combination thereof.

The (meth)acrylic acid ester-based monomer may be alkyl (meth)acrylate, and an alkyl of the alkyl(meth)acrylate may be a linear or branched C1 to C14 alkyl.

The acrylic resin may have a weight average molecular weight of about 500,000 to about 2,000,000.

The adhesive composition may further include an additive in an amount of about 0.5 part by weight to about 2 parts by weight based on 100 parts by weight of the acrylic resin.

Another exemplary embodiment of the present invention provides an adhesive film including an adhesive layer, which is a cured product of the adhesive composition for touch panels.

The adhesive layer may have a thickness of about 10 μm to about 50 μm.

The cured product may have a gel content of about 60% to about 90%.

Still another exemplary embodiment of the present invention provides a touch panel including: a conductive plastic film which has a conductive layer formed on one side thereof; and an adhesive layer which is attached to the conductive layer and includes a cured product of the adhesive composition for touch panels.

The conductive plastic film may be a polyethylene terephthalate film having an ITO (conductive metal oxide) layer formed on one side thereof.

Advantageous Effects

The adhesive composition for touch panels has excellent reliability against a bubble generation phenomenon and a white turbidity phenomenon.

The adhesive film does not generate bubbles even though being left to stand under a high temperature and high humidity atmosphere for a long period of time, and may exhibit excellent adhesive strength in spite of a small thickness.

BRIEF DESCRIPTION OF DRAWINGS

FIG. 1 is a schematic cross-sectional view of a touch panel according to an exemplary embodiment of the present invention.

FIG. 2 is a schematic cross-sectional view of a touch panel according to another exemplary embodiment of the present invention.

BEST MODE

Hereinafter, exemplary embodiments of the present invention will be described in detail. However, the exemplary embodiments are suggested as an example, the present invention is not limited thereby, and the present invention is defined only by the scope of the claims to be described below.

To clearly describe the present invention, parts irrespective of the description are omitted, and the same reference numerals will be given to the same or similar constituent elements throughout the specification.

In the drawings, the thicknesses of several layers and regions are enlarged so as to clearly express the layers and the regions. Moreover, in the drawings, the thicknesses of some layers and regions are exaggerated for convenience of explanation.

Hereinafter, the formation of any configuration at "an upper portion (or a lower portion)" of a base material or "on (or below)" of the base material means that any configuration is formed to be brought into contact with an upper surface (or a lower surface) of the base material, and does not limit that another configuration is not included between the base material and any configuration formed on (or below) the base material.

Adhesive Composition for Touch Panels

An exemplary embodiment of the present invention provides an adhesive composition for touch panels, including: an acrylic resin; a first curing agent having one to three functional groups; and a second curing agent having four to six functional groups.

When an adhesive layer formed by an adhesive composition is attached to a conductive plastic base material, bubbles may be generated under high temperature and high humidity conditions due to gases (outgassing) generated from the plastic base material. Further, there may occur a problem in that warpage of the plastic base material occurs due to the generated bubbles, and as a result, the site to which the adhesive layer is attached is lifted, and when the thickness of the adhesive layer becomes small, the adhesive strength is also generally decreased.

In contrast, even though the adhesive composition for touch panels is left to stand under a high temperature and high humidity atmosphere for a long period of time after being attached to glass or plastic, bubbles and white turbidity do not occur, and adhesive strength at a predetermined level or higher may be maintained.

Specifically, the adhesive composition includes: an acrylic resin; a first curing agent having one to three functional groups; and a second curing agent having four to six functional groups, and has excellent reliability by simultaneously using two curing agents along with an acrylic resin.

The functional group of the first curing agent and the second curing agent mean an isocyanate group, a curing agent having a smaller number of functional groups may be defined as a first curing agent, and a curing agent having a larger number of functional groups may be defined as a second curing agent. The curing agent may perform thermal curing by means of a heat treatment, and for example, the functional group of the curing agent may be reacted with OH groups of the acrylic resin to form urethane. The second curing agent having a larger number of functional groups has a relatively faster reaction rate under the same curing conditions than the first curing agent having a smaller number of functional groups, and as a result, the case of simultaneously using the first curing agent and the second curing agent may improve curing density and may provide a favorable advantage in terms of process, as compared to the case of using the first curing agent or the second curing agent alone.

Specifically, when the number of functional groups of the second curing agent exceeds six, curing is performed within a short time to decrease the curing density of the composition, and as a result, the reliability may deteriorate because bubbles are generated or white turbidity occurs in the composition.

The first curing agent and the second curing agent may be included in an amount of about 0.01 part by weight to about 1 part by weight based on 100 parts by weight of the acrylic resin. The first curing agent and the second curing agent are reacted with OH to form a cross-linkage.

Since the number of functional groups contained in the first curing agent is different from that contained in the second curing agent, the curing rate of the first curing agent may be different from that of the second curing agent. The first curing agent relatively slowly cures the composition, the second curing agent relatively quickly cures the composition, the curing density of the composition is improved by the difference between the curing rates, and as a result, the durability may be improved.

In contrast, when the curing is carried out by using only the first curing agent, there is a concern in that the curing is not achieved within a short period of time, and aging needs to be carried out later for a long period of time, and when the curing is carried out by using only the second curing agent, a sufficient time at which chains of a resin are arranged fails to be secured during the curing, and accordingly, the curing density may be affected.

The first curing agent and the second curing agent may be a hexamethylene diisocyanate (HDI)-based curing agent. Typically, a toluene diisocyanate (TDI)-based curing agent is frequently used, but the TDI-based curing agent has excellent reactivity with polyols, but has a yellowing property and is toxic to the human body when the curing agent remains as a monomer. The HDI-based curing agent includes an HDI curing agent and a derivative thereof, and for example, HDI isocyanurate triisocyanate, and the like may be used.

A chain length of the first curing agent may be longer than a chain length of the second curing agent. Typically, when a curing agent having a short chain length is used, the cross-linking density is increased, and as a result, a composition produced becomes hard, and when a curing agent having a long chain length is used, the flexibility and elasticity may be improved. Thus, the composition is formed by using both the second curing agent having a relatively short chain length and the first curing agent having a relatively long chain length, and may exhibit excellent adhesive performance.

The acrylic resin may be formed by polymerizing a (meth)acrylic acid ester-based monomer; and a hydrophilic functional group-containing monomer. The acrylic resin has a hydrophilic functional group and thus is bonded to functional groups of the first curing agent and the second curing agent to form urethane, and even though the acrylic resin is left to stand under a high temperature and high humidity atmosphere for a long period of time, it is possible to provide an adhesive composition in which bubbles and white turbidity do not occur, and the reliability is high.

Specifically, the hydrophilic functional group-containing monomer may be polymerized in a content of about 5 parts by weight to about 30 parts by weight based on 100 parts by weight of the (meth)acrylic acid ester-based monomer. Since the hydrophilic functional group-containing monomer includes a hydroxyl group (—OH), a carboxyl group (—COOH), and the like, the hydrophilic functional group-containing monomer maintains high polarity in most cases, and the overall polarity of the adhesive composition is decreased by including the hydrophilic functional group-containing monomer within the range, and as a result, excellent adhesive performance may be exhibited.

For example, when the hydrophilic functional group-containing monomer is included in an amount of less than about 5 parts by weight, the adhesive strength of the resin may be reduced, and when the hydrophilic functional group-containing monomer is left to stand at high temperature and high humidity, there is a concern in that white turbidity may occur, and when the hydrophilic functional group-containing monomer is included in an amount of more than about 30 parts by weight, the resin is aggregated due to excessive hydrogen bonds, and as a result, the coating performance may deteriorate during the coating.

The hydrophilic functional group-containing monomer may be one or more selected from the group consisting of a hydroxyl group-containing monomer, an amino group-containing monomer, a carboxyl group-containing monomer, a sulfone group-containing monomer, a morpholine group-containing monomer, a glycidyl group-containing monomer, and a combination thereof.

Examples of the hydroxyl group-containing monomer include (meth)acrylic acid hydroxy alkyl esters such as 2-hydroxyethyl(meth)acrylate, 4-hydroxybutyl(meth)acrylate, 5-hydroxypentyl(meth)acrylate, 6-hydroxyhexyl(meth)acrylate, 8-hydroxyoctyl(meth)acrylate, 10-hydroxydecyl(meth)acrylate, and (4-hydroxymethylcyclohexyl)methyl (meth)acrylate; caprolactone-modified monomers such as caprolactone modified 2-hydroxyethyl(meth)acrylate; primary hydroxyl group-containing monomers such as 2-acryloyloxyethyl-2-hydroxyethyl phthalic acid, N-methylol (meth)acrylamide, and N-hydroxyethyl(meth)acrylamide; secondary hydroxyl group-containing monomers such as 2-hydroxypropyl(meth)acrylate, 2-hydroxybutyl(meth)acrylate, 2-hydroxy-3-phenoxypropyl(meth)acrylate, 3-chloro-2-hydroxypropyl(meth)acrylate, and 2-hydroxy-3-phenoxypropyl(meth)acrylate; and tertiary hydroxyl group-containing monomers such as 2,2-dimethyl-2-hydroxyethyl (meth)acrylate.

Among the hydroxyl group-containing monomers, it is particularly preferred to use 2-hydroxyethyl(meth)acrylate since 2-hydroxyethyl(meth)acrylate has little impurities such as di(meth)acrylate and is easily prepared.

Examples of the amino group-containing monomer include dimethylaminoethyl(meth)acrylate, diethylaminoethyl(meth)acrylate, and the like.

Examples of the carboxyl group-containing monomer include acrylic acid, methacrylic acid, crotonic acid, maleic acid, maleic anhydride, itaconic acid, fumaric acid, acrylamide N-glycolic acid, cinnamic acid, Michael addition products of (meth)acrylic acid (for example, an acrylic acid dimer, a methacrylic acid dimer, an acrylic acid trimer, a methacrylic acid trimer, an acrylic acid tetramer, a methacrylic acid tetramer, and the like), 2-(meth)acryloyloxyethyl dicarboxylic acid monoesters (for example, 2-acryloyloxyethyl succinic acid monoester, 2-methacryloyloxyethyl succinic acid monoester, 2-acryloyloxyethyl phthalic acid monoester, 2-methacryloyloxyethyl phthalic acid monoester, 2-acryloyloxyethyl hexahydrophthalic acid monoester, 2-methacryloyloxyethyl hexahydrophthalic acid monoester, and the like), and the like.

Examples of the sulfone group-containing monomer include olefin sulfones such as ethylene sulfone, allyl sulfone, and meta allyl sulfone, 2-acrylamide-2-methylpropane sulfone, styrene sulfone, or salts thereof, and the like. Example of the morpholine group-containing monomer include 4-methylmorpholine, and the like, and examples of the glycidyl group-containing monomer include glycidyl (meth)acrylate, allylglycidyl ether, and the like.

The (meth)acrylic acid ester monomer may be, for example, alkyl(meth)acrylate, and is not limited thereto. An alkyl of the alkyl(meth)acrylate may be a linear or branched C1 to C14 alkyl, and may be specifically a C1 to C8 alkyl. The cured product of the adhesive composition for touch panels may be adjusted so as to have appropriate aggregation strength, peel strength, and adhesive characteristics by using the alkyl(meth)acrylate having carbon atoms within the range.

Specifically, the (meth)acrylic acid ester-based monomer may be one or more selected from the group consisting of methyl (meth)acrylate, ethyl (meth)acrylate, n-propyl (meth)acrylate, isopropyl (meth)acrylate, n-butyl (meth)acrylate, t-butyl (meth)acrylate, sec-butyl (meth)acrylate, pentyl (meth)acrylate, 2-ethylhexyl (meth)acrylate, 2-ethylbutyl (meth)acrylate, n-octyl (meth)acrylate, isooctyl (meth)acrylate, isononyl (meth)acrylate, lauryl (meth)acrylate, tetradecyl (meth)acrylate, and a combination thereof.

The acrylic resin may have a weight average molecular weight (or a number average molecular weight) of about 500,000 g/mol to about 2,000,000 g/mol. When the molecular weight of the acrylic resin is more than 2,000,000 g/mol, there is a problem in that the specific weight of the adhesive composition is increased, and when the molecular weight thereof is less than 500,000 g/mol, there is a concern in that the durability may be weak, and bubbles may be generated when the acrylic resin is left to stand at high temperature and high humidity.

The adhesive composition may further include an additive in an amount of about 0.5 part by weight to about 2 parts by weight based on 100 parts by weight of the acrylic resin. When the additive is included in an amount of less than about 0.5 part by weight, there is a concern in that the adhesive strength may be decreased, and when the additive is included in an amount of more than about 2 parts by weight, the durability may deteriorate due to the additive which does not participate in the curing and remains. The examples of the additive may include an adhesive enhancer, a thermosetting monomer, an antioxidant, and the like.

For example, the adhesive enhancer is added in order to allow monomers, which an adhesive composition includes, to be polymerized well with each other and to improve the adhesive level, adhesive properties may be improved and the polarity may be decreased by adding the adhesive enhancer, and as a result, it is possible to suppress a white turbidity phenomenon of an adhesive composition, which is applied to a liquid crystal display, in an external environment such as high temperature and high humidity.

Adhesive Film

Another exemplary embodiment of the present invention may provide an adhesive film including an adhesive layer, which is a cured product of the adhesive composition for touch panels.

In curing the adhesive composition for touch panels, curing by means of heat is advantageous in consideration of the curing rate, ease with which an irradiation device can be purchased, prices, and the like. For example, the composition coated on a base material layer at about 100° C. or more may be cured for about 3 minutes by being transported on a conveyor belt, and an adhesive layer having a uniform surface may be formed by drying the cured product at a predetermined temperature.

The adhesive layer may have a thickness of about 10 μm to about 50 μm. Typically, an adhesive layer may exhibit adhesive property only when the adhesive layer has a thickness of about 25 μm or more, but the adhesive layer is a cured product of the above-described adhesive composition for touch panels, and may maintain excellent durability and adhesive property even though the thickness of the adhesive layer is about 50 μm or less, which is thin.

Further, the adhesive layer has a thickness within the range, thereby being applied to a touch panel or a touch screen and implementing an adhesive film having excellent durability.

The cured product may have a gel content of about 60% to about 90%. The cured product has a gel content within the range, thereby implementing sufficient adhesive property and excellent durability. When the gel content is less than about 60%, the degree of curing is so minimal that a definite shape fails to be implemented and the cured product may flow down, and when the gel content is more than about 90%, the viscosity is so high that the cured product may aggregate, and accordingly, since it is difficult to easily implement a shape as, for example, a film, the adhesive performance may deteriorate.

For example, the gel content is an index indicating the crosslinking density after curing, is also referred to as a gel fraction, and may be calculated by the following Equation 1.

$$\text{Gel content } (\%) = W_2/W_1 \qquad \text{[Equation 1]}$$

In Equation 1, $W_1$ means an initial weight which is a weight prior to immersing a sample, which is obtained by cutting a cured product of which the gel content is to be measured into a predetermined size, in a solvent, and $W_2$ means a post weight which is a weight of a sample obtained by immersing the sample in a solvent and leaving the sample to stand for a predetermined time, and subsequently filtering the sample using a filtration device, and then drying the sample under conditions of a predetermined temperature and a predetermined time.

The solvent may use, for example, chloroform, ethyl acetate, acetone, methanol, ethanol, isopropanol, butanol, dimethylformamide, and the like, and the filtration device may use, for example, a 300 mesh steel screen, but the examples are not limited thereto.

The time for which the sample is immersed and left to stand in a solvent may be, for example, about 24 hours to about 48 hours, but the time is sufficient as long as the other components except for the gel may be dissolved in a solvent and separated for the time, and is not particularly limited.

In addition, the conditions of temperature and time, under which a sample obtained by being filtered by means of the filtration device is dried, may be about 100° C. to about 150° C. and about 1 hour to about 2 hours, but the conditions of temperature and time may be appropriately carried out under conditions of temperature and time sufficient for drying the sample, and are not particularly limited.

Touch Panel

Still another exemplary embodiment of the present invention provides a touch panel including: a conductive plastic film which has a conductive layer formed on one side thereof; and an adhesive layer which is attached to the conductive layer and includes a cured product of the adhesive composition for touch panels.

Referring to FIG. 1, a touch panel 100 includes a conductive plastic film 40 including a plastic base material layer 30 and a conductive layer 20 formed on one side of the plastic base material layer 30, and may have a structure in which an adhesive layer 10 is attached to one side of the conductive layer 20 of the conductive plastic film 40. Furthermore, as illustrated in FIG. 2, when the two conductive plastic films 40 are included, a touch panel may have a structure in which the conductive layer 20 is attached to both sides of the adhesive layer 10.

The touch panel may be, for example, an electrostatic capacitance-type touch panel. Further, a specific structure of the touch panel or a method of forming the same is not particularly limited as long as the above-described adhesive composition for touch panels is applied, and a general configuration in the art may be adopted.

The specific kind of the conductive plastic film 40 is not particularly limited, and a publicly-known conductive film in the art may be used. For example, the conductive film 40 may be a transparent plastic film having an ITO electrode layer formed on one side thereof. Specifically, as the transparent plastic film forming the plastic base material layer 30, it is possible to use a polyethylene terephthalate film, a polytetrafluoroethylene film, a polyethylene film, a polypropylene film, a polybutene film, a polybutadiene film, a vinyl chloride copolymer film, a polyurethane film, an ethylene-vinyl acetate film, an ethylene-propylene copolymer film, an ethylene-ethyl acrylate copolymer film, an ethylene-methyl acrylate copolymer film or a polyimide film, and the like, and the transparent plastic film is not limited thereto.

More specifically, the plastic base material layer 30 may be a polyethylene terephthalate (PET) film.

Hereinafter, specific examples of the present invention will be suggested. However, the Examples described below are only provided for specifically exemplifying or explaining the present invention, and the present invention is not limited thereby.

EXAMPLES AND COMPARATIVE EXAMPLES

Example 1

2-ethylhexyl acrylate (2-EHA), isobornyl acrylate (IBOA), and hydroxyethyl acrylate (HEA) were polymerized at a content ratio of 60 parts by weight, 22 parts by weight, and 18 parts by weight, respectively, thereby forming an acrylic resin having a molecular weight of 1,000,000.

An adhesive composition was prepared by mixing an HDI curing agent having three functional groups and an HDI curing agent having six functional groups in an amount of 0.5 part by weight and 0.3 part by weight, respectively, based on 100 parts by weight of the formed acrylic resin.

A coating solution was prepared by mixing toluene as a solvent with the adhesive composition, a polyethylene terephthalate film (thickness: 75 m) release-treated with the coating solution was thermally cured, and then the film was coated by using a bar coater such that the thickness of the adhesive layer becomes 50 m. Thereafter, the polyethylene terephthalate film was put into a Mathis oven and a heat treatment was carried out at 100° C. for 5 minutes, thereby preparing an adhesive film.

Example 2

An adhesive film was prepared in the same manner as in Example 1, except that an adhesive composition was prepared by mixing an HDI curing agent having two functional groups and an HDI curing agent having five functional groups in an amount of 0.5 part by weight and 0.3 part by weight, respectively, based on 100 parts by weight of the formed acrylic resin, and the polyethylene terephthalate film was coated such that the thickness of the adhesive layer became 30 μm.

Example 3

An adhesive film was prepared in the same manner as in Example 1, except that an adhesive composition was prepared by mixing an HDI curing agent having three functional groups and an HDI curing agent having six functional groups in an amount of 0.5 part by weight and 0.3 part by weight, respectively, based on 100 parts by weight of the formed acrylic resin, and the polyethylene terephthalate film was coated such that the thickness of the adhesive layer became 15 μm.

Comparative Example 1

An adhesive film was prepared in the same manner as in Example 1, except that an adhesive composition was prepared by not mixing an HDI curing agent having three functional groups or less and mixing an HDI curing agent having six functional groups with the formed acrylic resin.

Comparative Example 2

An adhesive film was prepared in the same manner as in Example 1, except that an adhesive composition was prepared by mixing an HDI curing agent having three functional groups and an HDI curing agent having eight functional groups based on 100 parts by weight of the formed acrylic resin.

<Experimental Example>—Physical Properties of Adhesive Film

1) Measurement of White Turbidity Phenomenon and Bubble Generation Phenomenon: The adhesive film attached to glass was stored under conditions of 85° C. and 85% RH for 200 hours, and it was observed whether a white spot was observed or bubbles were generated.

2) Measurement of Adhesive Strength: The adhesive film was manufactured into 25 mm×40 mm (breath×length), the adhesive film was attached to glass by making one reciprocating motion of a 2 kg roller, and an adhesive strength was measured when the attached adhesive film was pulled and peeled off at 300 mm/min in a 180° direction of the surface of the attached adhesive film.

3) Color Index and Haze: The color index of the adhesive film and the haze of the adhesive film were measured by means of Minolta CM-5 and BYK Gard Plus, respectively.

4) Calculation of Gel Content: The gel content was calculated by the following Equation 1.

$$\text{Gel content (\%)} = W_2/W_1 \qquad \text{[Equation 1]}$$

In Equation 1, $W_1$ means an initial weight which is a weight prior to immersing a sample, which is obtained by cutting a cured product of which the gel content is to be measured into a predetermined size, in a solvent, and $W_2$ means a post weight which is a weight of a sample obtained by immersing the sample in a solvent and leaving the sample to stand for a predetermined time, and subsequently filtering the sample using a filtration device, and then drying the sample under conditions of a predetermined temperature and a predetermined time.

Measurement Conditions: Solvent (ethyl acetate), Filtration device (300 mesh mesh screen), Time (24 hours) for which the sample is left to stand while being immersed in a solvent, Temperature and time (110° C. and 1 hour) at which the sample filtered by means of the filtration device is dried

TABLE 1

| | White turbidity | Bubble generation | Gel content (%) | Adhesive strength (g/in) | Haze (%) | Color index | | |
|---|---|---|---|---|---|---|---|---|
| | | | | | | L* | a* | b* |
| Example 1 | None | No bubble generation | 60~90 | 1740 | 0.32 | 96.82 | −0.29 | 0.19 |
| Example 2 | None | No bubble generation | 60~90 | 1410 | 0.31 | 96.62 | −0.28 | 0.16 |
| Example 3 | None | No bubble generation | 60~90 | 1350 | 0.31 | 96.73 | −0.28 | 0.17 |
| Comparative Example 1 | Occurred | Bubble generation | Less than 60 | 1450 | 0.43 | 96.32 | −0.29 | 0.24 |
| Comparative Example 2 | Occurred | Bubble generation | Less than 60 | 1240 | 0.52 | 96.45 | −0.28 | 0.32 |

Referring to Table 1, it could be seen that in the adhesive films of Examples 1 to 3, the white turbidity phenomenon did not occur and the bubbles were not generated, whereas in the adhesive films of Comparative Examples 1 and 2, the white turbidity phenomenon occurred, the bubbles were generated, and the adhesive strengths were lower than those in Examples 1 to 3.

Further, since the haze values in Examples 1 to 3 were measured as values higher than those in Comparative Examples 1 and 2, and b* in Examples 1 to 3 was measured as values higher than the values in Comparative Examples 1 and 2, it was confirmed that the optical characteristics in the Examples were better than those in the Comparative Examples.

EXPLANATION OF REFERENCE NUMERALS AND SYMBOLS 100, 200: Touch panel
10: Adhesive layer,
20: Conductive layer
30: Plastic base material layer,
40: Conductive plastic film

The invention claimed is:

1. An adhesive composition for touch panels, comprising:
an acrylic resin;
a first curing agent, which is a hexamethylene diisocyanate (HDI) derivative having two or three isocyanate groups; and
a second curing agent, which is a hexamethylene diisocyanate (HDI) derivative having four to six isocyanate groups.

2. The adhesive composition of claim 1, wherein the adhesive composition comprises the first curing agent and the second curing agent in an amount of 0.01 part by weight to 1 part by weight based on 100 parts by weight of the acrylic resin.

3. The adhesive composition of claim 1, wherein a chain length of the first curing agent is longer than a chain length of the second curing agent.

4. The adhesive composition of claim 1, wherein the acrylic resin is formed by polymerizing a (meth)acrylic acid ester-based monomer and a hydrophilic functional group-containing monomer.

5. The adhesive composition of claim 4, wherein the hydrophilic functional group-containing monomer is polymerized in a content of 5 parts by weight to 30 parts by weight based on 100 parts by weight of the (meth)acrylic acid ester-based monomer.

6. The adhesive composition of claim 4, wherein the hydrophilic functional group-containing monomer is one or more selected from the group consisting of a hydroxyl group-containing monomer, an amino group-containing monomer, a carboxyl group-containing monomer, a sulfone group-containing monomer, a morpholine group-containing monomer, a glycidyl group-containing monomer, and a combination thereof.

7. The adhesive composition of claim 4, wherein the (meth)acrylic acid ester-based monomer is alkyl (meth) acrylate, and an alkyl of the alkyl(meth)acrylate is a linear or branched C1 to C14 alkyl.

8. The adhesive composition of claim 1, wherein the acrylic resin has a weight average molecular weight (or a number average molecular weight) of 500,000 to 2,000,000.

9. The adhesive composition of claim 1, further comprising:
   an additive in an amount of 0.5 part by weight to 2 parts by weight based on 100 parts by weight of the acrylic resin.

10. An adhesive film comprising an adhesive layer, which is a cured product of the adhesive composition for touch panels according to claim 1.

11. The adhesive film of claim 10, wherein the adhesive layer has a thickness of 10 μm to 50 μm.

12. The adhesive film of claim 10, wherein the cured product has a gel content of 60% to 90%.

13. A touch panel comprising:
   a conductive plastic film which has a conductive layer formed on one side thereof; and
   an adhesive layer which is attached to the conductive layer and comprises a cured product of the adhesive composition for touch panels according to claim 1.

14. The touch panel of claim 13, wherein the conductive plastic film is a polyethylene terephthalate film having an ITO (conductive metal oxide) layer formed on one side thereof.

* * * * *